Figure 1:
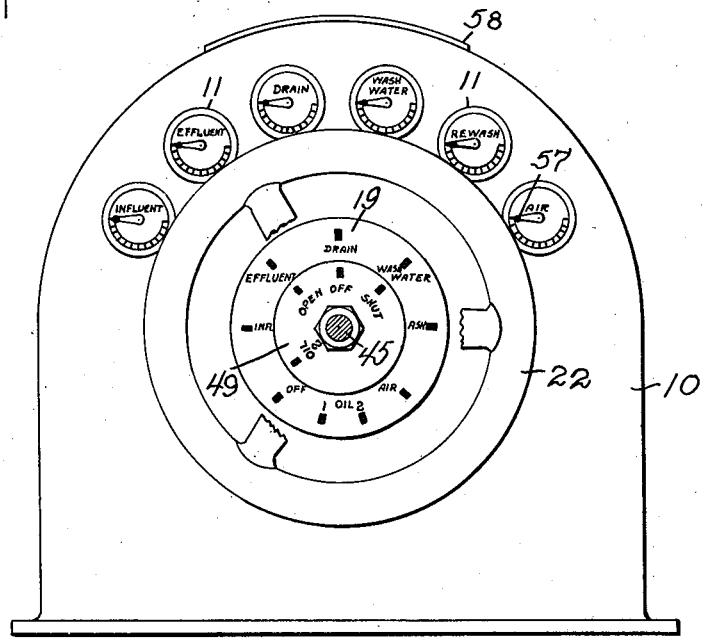

May 14, 1935.  J. E. WILLIAMSON  2,001,320
CONTROL APPARATUS
Filed Dec. 10, 1930    4 Sheets-Sheet 1

Inventor
James E. Williamson,
By his Attorney
Wm H Canfield.

May 14, 1935.   J. E. WILLIAMSON   2,001,320
CONTROL APPARATUS
Filed Dec. 10, 1930    4 Sheets—Sheet 2

Inventor
James E. Williamson,
By his Attorney
Wm H Canfield

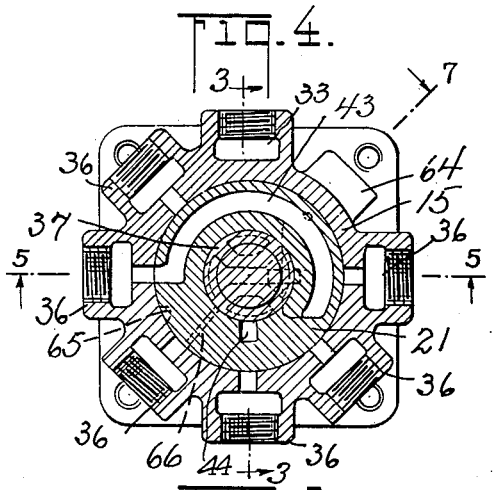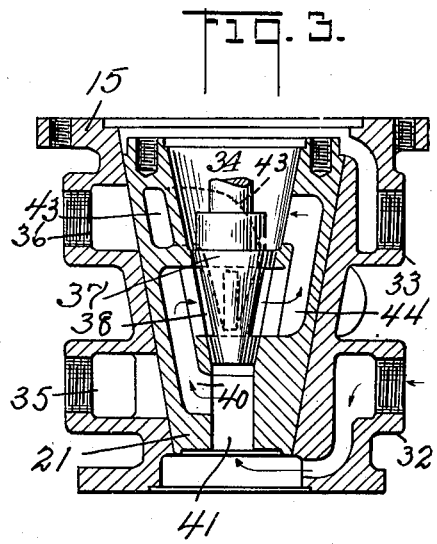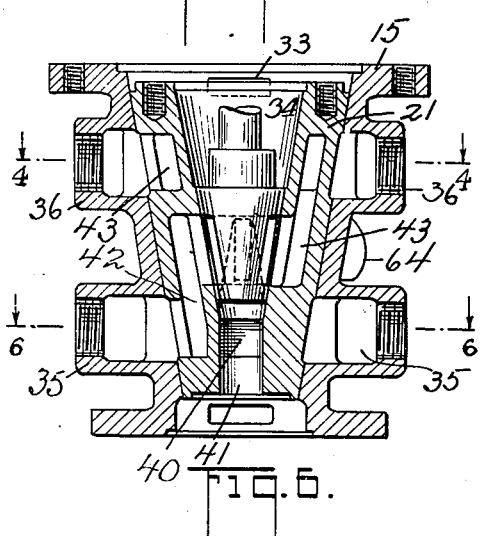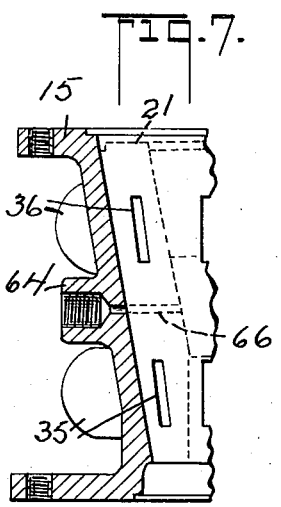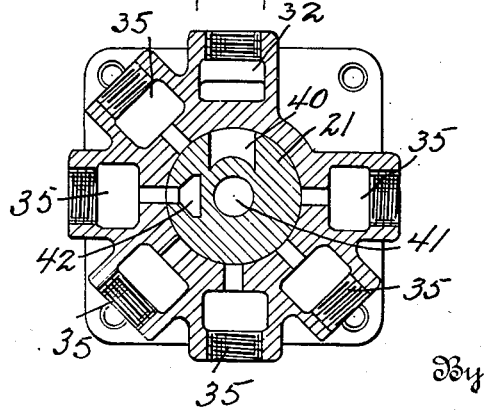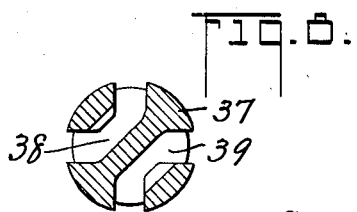

May 14, 1935.   J. E. WILLIAMSON   2,001,320
CONTROL APPARATUS
Filed Dec. 10, 1930   4 Sheets-Sheet 4
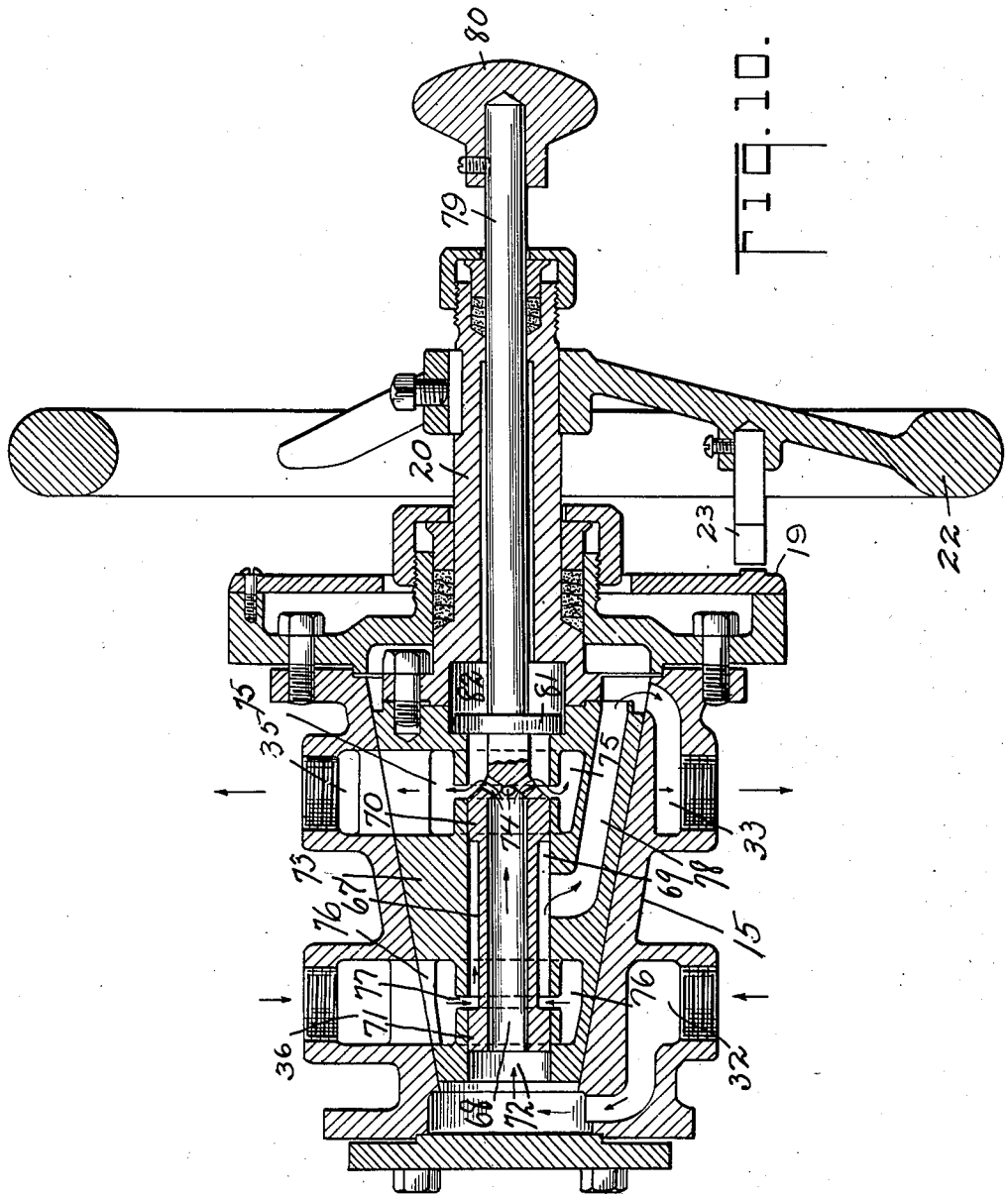

Patented May 14, 1935

2,001,320

UNITED STATES PATENT OFFICE 2,001,320

CONTROL APPARATUS

James E. Williamson, Maplewood, N. J.

Application December 10, 1930, Serial No. 501,233

3 Claims. (Cl. 277—41)

This invention relates to a control apparatus which has a valve for selectively connecting various pipes to direct fluid under pressure to various elements to be operated and return such fluid to an outlet or waste and, furthermore, to regulate the flow by a secondary valve. This allows a settling of the parts for the direction of flow and the separate opening and closing through the apparatus. The invention makes it possible to install the apparatus in a small space.

The apparatus can be used for many different installations but is particularly adapted for use in water filtration plants where a multiplicity of valves are necessarily opened one or more times a day. The operating valves are controlled by fluid under pressure, and are usually hydraulically operated. For instance, in describing the various valves and employing the nomenclature usual in water filter practice an influent valve may supply water to the filter; an effluent valve controls the flow of filtered water from the filter; a drain valve may control the flow off of dirty water resulting from washing the filter bed; a wash water valve controls the supply of water for cleaning the filter bed, usually by a reversal of the water flow through the filter material; and a re-wash valve to control the flow of filtered water to the drain immediately following the washing of the filter material when desired. An air valve is frequently employed for controlling a supply of air to the filter bed, used to supplement the washing effect obtained by the water. Unless the valves described above, usually hydraulically operated, are in sight of the operator a dial for each valve is provided and connected to the valve to indicate whether it is open or shut.

It is now the custom to use what is called in the art an operating table, usually constructed in box-like form of marble and having a four-way hydraulic cock for each hydraulic valve to be operated. These cocks have their supply connected to a common header and the discharge connections attached to a common header. Each hydraulic cock in the table is usually provided with an extension rod to project through the top of the table and then mounted with a lever or knob so that the cocks may be operated from that point. Name plates indicate the valves and indicators show whether they are open or closed. This mass of handles and levers now in use and the separate connections for separate valves necessitate large operating tables containing much piping and are expensive to install.

The object of the invention is to provide a single primary valve, with connections to the group of hydraulically operated valves of each filter unit to operate them, and a single secondary valve to direct the flow through the connections established by the setting of the primary valve. Each valve has a handle and they are usually placed one within another. In this way a small column or standard contains all the mechanism which formerly required a large box-like table. Furthermore, the operator may remain in one place and has a single control apparatus before him and the observation and operation of the control apparatus is simplified. This is possible by reason of the location of the handles on the same end of the valve and proper indicators being installed whereby the various operations and their results can at all times be observed by the operator.

Figure 9:
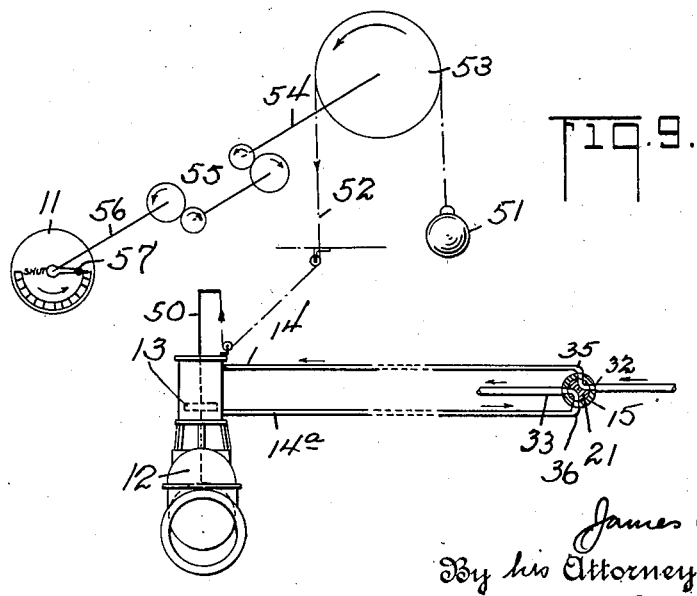
Figure 2:
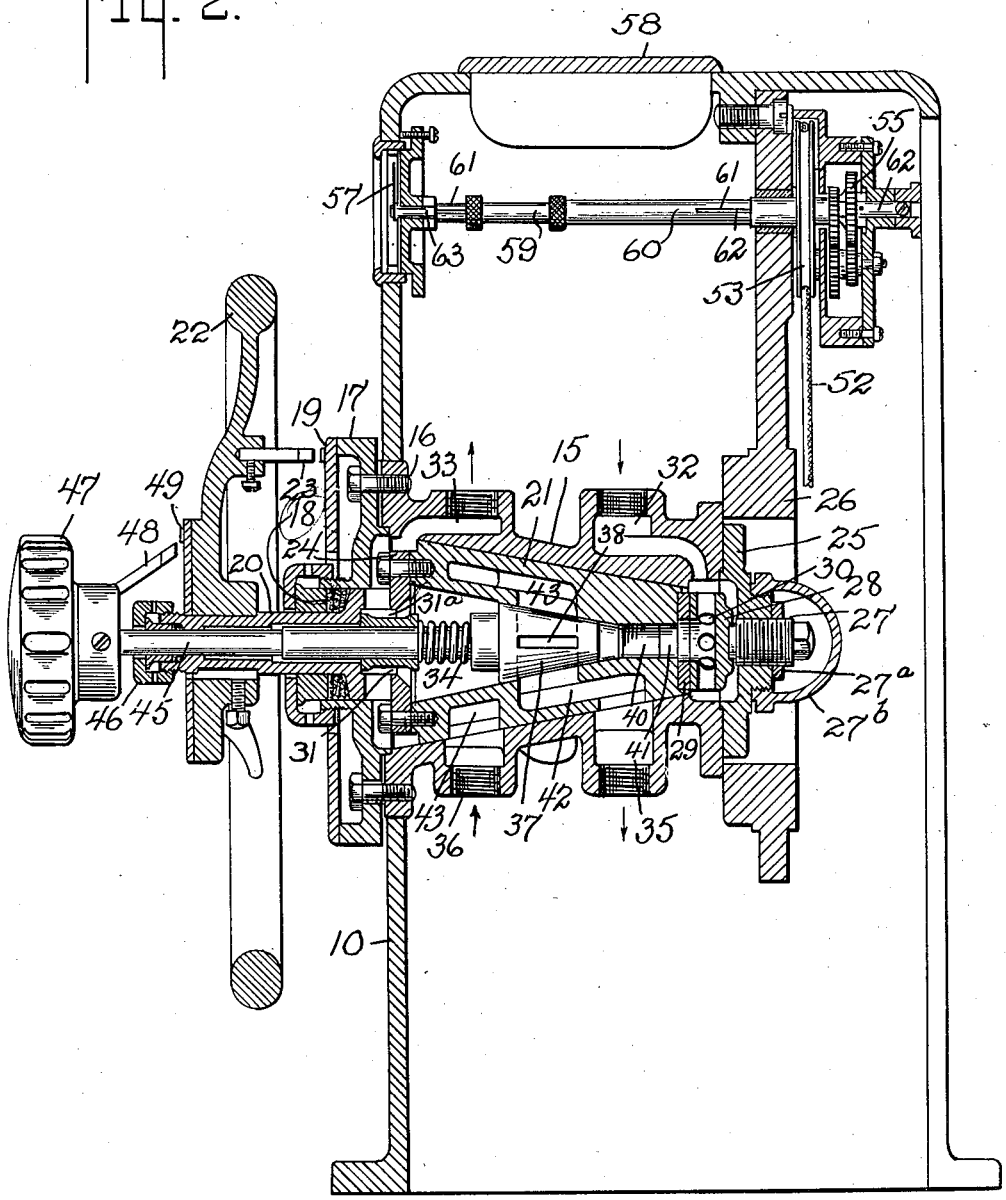

The invention is illustrated in the accompanying drawings in which Figure 1 is a face view of a casing or housing and showing one form of control apparatus. Figure 2 is an enlarged vertical section through Figure 1. Figure 3 is a detail section of the primary and secondary valves taken on line 3—3 in Figure 4. Figure 4 is a section on line 4—4 in Figure 5. Figure 5 is a section on line 5—5 in Figure 4. Figure 6 is a section on line 6—6 in Figure 5. Figure 7 is a half-section taken on line 7 in Figure 5 with the sleeve shown in dotted outline and moved one-half rotation. Figure 8 is a cross section of the secondary valve showing the ports therein. Figure 9 is a diagrammatic perspective view of a hydraulically operated valve controlled by this apparatus and its connection with the indicating dial. Figure 10 is a view similar to Figure 2 but showing a modified form of construction.

The preferred construction for the installation of the apparatus is in a column or other convenient housing, one form of which is shown at 10. In case the hydraulic valve can not be observed the indicators or dials 11 are placed where they can be easily seen. This observation enables the operator to open or close the valves for the required distance and to observe the speed of the operation of the valves. These valves are remote from this control apparatus and not shown connected thereto but one is shown at 12 in Figure 9 and is of the usual hydraulically operated gate type with the hydraulic cylinder 13 connected by pipes 14 and 14ª with the apparatus described herein for the control thereof. The hydraulic valves or gates are conventional and their constructions are not new.

The casing 15 is shown secured to the housing by means of the plate 26 through the medium of screws not shown due to the angle at which the section is taken. The holes for such screws are shown in the four corners of the square flange in Figure 4 and Figure 6 and in section at Figure 7. Screws 16 secure the cover plate 17 in which is provided the stuffing box 18 and on which is secured the indicator dial plate 19 to carry indicia for indicating the setting of the valve.

The details and use thereof will be described hereinafter. The inner member of the stuffing box 18 extends as a rotatable sleeve 20 which is connected to one end of a valve sleeve 21 rotatable inside the valve casing 15. The sleeve 20 is provided with a hand wheel 22 or its equivalent which is used to rotate the valve sleeve 21 and which handle has a pointer 23 to be used as the index on the dial plate 19. The sleeve 20 which turns with the hand wheel 22 has a flange 24 which is secured to the valve sleeve 21 for its rotation. At the other end of the valve sleeve 21 is a support 25 fastened to the valve casing 15. The support 25 is provided with an adjusting screw 27 which supports the cap collar 28 against the washer 29 which in turn presses against the end of the sleeve 21 to prevent undue friction at the conical walls in contact with the valve casing 15. The holes 30 in the cap collar 28 allow communication with the bore 41 of the sleeve 21 and the port 32. The lock nut 27ª secures the adjusting screw 27 and the cap 27ᵇ provides means of preventing leakage about the adjusting screw 27.

The valve casing 15 is provided with nozzles or pipe connections on the outside and they thereby communicate with a source of supply of water under pressure, with the various valves to be operated and with the waste pipe.

The various pipe connections or nozzles on the valve casing may be disposed as desired for the different valves, with appropriate index markings but for clear description I will arbitrarily place the inlet port or port 32 and the waste outlet port 33 at the top of the valve casing. The pressure water enters the port 32 and passes through the holes 30 into the inside of the small end, at 41, of the valve sleeve 21. The waste water flows from the other end of the valve sleeve through chamber 34, passage 31 and the openings 31ª in the large end of the sleeve to the outlet or waste port 33. The pipes which conduct water to and from the valve casing are omitted from the drawings.

The valve sleeve 21 is provided with passages that direct the pressure water to and receive waste water from various gates 12 and I will describe the apparatus as operating an influent gate which is the one admitting unfiltered water to the filter; an effluent gate which is the filtered water outlet; a drain which is the waste outlet while washing the filter beds; a wash gate which regulates water supply under pressure for washing the filter bed, usually by a reversely directed stream in the filter; a re-wash gate which is the waste outlet for first filtered water after washing and an air inlet used in some filters as a supplementary means to the wash water. In addition I have shown an adjustment whereby, by a proper positioning of the valve, appropriate passages are made to register to enable the forcing of oil or grease by a pump to lubricate the primary valve sleeve and secondary valve plug of this apparatus. The dial markings on the plate 17 are in accordance with the above described installations.

The valve casing has a series of nozzles 35 and 36 arranged in pairs and adapted to supply pressure water through 35 to a gate 12 and to receive the waste water from the gate at the nozzle 36. I show six pairs of such nozzles in the particular installation I have illustrated.

The valve sleeve 21 has passages to conduct pressure water from the inlet nozzle 32 to the outlet nozzle 35 and from the inlet nozzle 36, of each pair, to the waste outlet 33. Inside the valve sleeve 21 is a sleeve plug 37 which has passages to connect the passages of the valve sleeve 21. The sleeve plug is shown in cross section in Figure 8 and has two passages 38 and 39 each having its ends at angles to each other.

The valve sleeve 21 has a passage 40 which connects the bore 41 of inlet end of the valve sleeve 21 with the inside wall of the valve sleeve. At a suitable inside angle to this passage is a passage 42 which extends from the inside wall of the sleeve to the outside wall and rotates in a plane to bring it in register with the nozzles 35 which are connected with the inlet pipes 14 of the gates 12. (Fig. 9). After the pressure water leaves a gate 12 it passes through a pipe 14ª to one of the inlet or waste water nozzles 36. Adapted to register with these ports 36 is a port 43 in the valve sleeve 21. This port has one end in the outer wall of the valve sleeve and passes part way around the sleeve as shown in Figure 4 and has its other end in the inner wall opposite the port 42 as shown in Figure 5. Spaced from the end of the port 43 in the outer wall is a port 44 which extends from one end in the plane of the passages 38 and 39 to beyond the sleeve plug 37 where it communicates with the chamber 34. The chamber 34 communicates with the outlet passage 31 of the sleeve which in turn is connected to the outlet or waste nozzle 33 of the valve casing.

It will be evident that when the valve sleeve 21 is set to its proper position in accordance with the index 19 by means of the hand wheel 22 that the passages of the sleeve 21 are in register with the nozzles of the casing 15 and the passage of pressure water through them is possible. The valve plug 37, however, controls the flow. The valve plug is preferably a tapered plug and is secured on a stem 45 which extends through the sleeve 20 and stuffing box 46. The stem 45 has a handle or knob 47 which has a pointer 48 to register with a flow index 49 on the wheel 22.

When the sleeve 21 is properly set as described above the pointer 48 may be set at "open". This indicates that the ends of the passages 38 and 39 are opposite the inner ends of ports 40, 42, 43 and 44 and the gate selected on dial 19 is being operated and opened by pressure water passing through the valve. When the pointer 48 is placed at "shut" on the indicator 49 the position of the ends of the ports 38 and 39 of the plug 37 will have been reversed from the position previously described and thus directs the pressure water through the ports in the sleeve 21 and appropriate nozzles and piping to shut the gate previously opened.

It will be noted that each of the index plates is provided with a position marked "Off". This position indicates that one or both of the rotatable valve elements are so positioned that the ports are wholly out of register with adjacent ports so that no passage of fluid can occur.

When the control apparatus has been set for the accomplishment of an operation the progress of such operation can be viewed, in the absence of the gate or other device itself, by the dials 11. These dials or indicators indicate the rapidity of opening or closing of the valves or gates or when to check such opening or closing if desired.

One connection for this purpose is shown in diagrammatic form in Figure 9 and in section in Figure 2. The gate 12 has a stem 50 which projects from the piston of the hydraulic gate 12 through the casing. The gate of the valve 12 is operated by water under pressure directed by the control apparatus to the lower end of the cylinder 13 and below a closely fitted piston within such cylinder to open the valve or to the upper end of said cylinder and above the said piston to close the valve. A strand 52 secured to the stem 50 is lead over properly disposed pulleys and over a sheave 53 on a shaft 54 which in turn is connected by suitable gearing 55 to the shaft 56 on which is the hand 57 of the indicator 11. The shaft 56 is preferably made separable as in Figure 2. The housing 10 has a lid 58 to give access to the connecting shafts 56 of the indicator mechanism. The shaft 56 may be easily removed or placed as it is of telescopic construction having two members 59 and 60 which are provided with split ends 61 to snugly fit over the extended end of the driving shaft 62 at the gearing end and over the extended end of the driven shaft of the hand at the indicator end.

The valve sleeve and the valve plug can be lubricated through a nozzle 64 to which an oil pump or grease gun is connected. The valve sleeve has a duct 65 which is brought in register with the nozzle 64 for lubricating the sleeve 21 and a duct 66 through the wall of the sleeve 21 allows the lubricant to pass to the plug 37 when the duct 66 is placed in register with the nozzle 64. These positions of the sleeve and plug can be taken by reference to the indices 19 and 49 respectively.

While water under pressure is described in this specification as the operating medium for the gates 12, it will be evident that oil or air or other control fluid may be employed.

In Figure 10, I show a modification in which the inlet and waste nozzles 32 and 33 respectively are arranged at the bottom of the valve casing 15 and the control of the passage of pressure fluid is by means of a sliding double piston element instead of a rotary plug. The piston is shown at 67 and has an internal passage 68 and an external passage 69. The piston ends 70 and 71 clearly fit the bore in the sleeve 73 to prevent undue leakage of the pressure fluid but sufficiently free to permit movement endwise. The inlet port 32 communicates with the bore 72 of the sleeve 73 which is open to the port 68 of the piston. The end of the piston has openings 74 which communicate through the passage 75 in the sleeve with the outlet 35 to the gate to be actuated. The fluid in returning from the actuated gate cylinder enters the nozzle 36 and passage 76 communicating with the external passage 69 of piston and thus to the passage 78 of the sleeve to the waste outlet 33 of the casing 15. The piston may be assumed to be in the position to direct the pressure fluid to close the actuated gate. The piston is provided with a stem 79 and a handle 80 also a flange 81 limiting its movement in the chamber 82. When the piston is slid to move the ends 70 and 71 over the communicating passages to ports 75 and 76 respectively the flow of pressure fluid is shut off but if the movement of the piston is continued so that the flange 81 contacts with the opposite end of the chamber 82 from position shown then the direction flow of the pressure fluid is reversed from that hereinabove described and thus directed to open the actuated valve.

With this apparatus the selected gates can be operated from a convenient point, the apparatus occupying but little space and being inexpensive to install.

It will be noted that the primary valve as embodied in the valve sleeve 21 and the secondary valve as embodied in the valve plug 37 can be of various forms, not necessarily tapered valves, and changes can be made in the arrangement of proportions of the control apparatus without departing from the scope of the invention.

It will be evident that in this illustration and description the complementary passages are shown at right angles but angles other than right angles can be the relative dispositions of these passages without interfering in the least with its operation.

I claim:—

1. A control apparatus comprising a substantially cylindrical valve casing with radially spaced ports on its periphery, a valve sleeve rotatable in the casing and having passages disposed to register with selected ports of the casing, and a rotatable valve plug in said valve sleeve having imperforate ends and having only transverse passages to establish communication between the passages of the sleeve.

2. A control apparatus for filter beds comprising a valve casing which is provided with ports for attachment to feed and return pipes of motors; said casing having in addition a water inlet port and a waste outlet port, a primary valve having ports to selectively connect said ports in the casing with the inlet and waste ports of the casing, a secondary valve in the primary valve and having passes to connect the ports of the primary valve and disposed in a manner to cause the control of the amount of flow and direction of flow through the primary valve to be regulated by the secondary valve alone and means for indicating the presence and direction of flow through the ports.

3. In a control apparatus, a valve comprising a casing having an inlet port 32 and an outlet port 33, both communicating with the inside of the casing but at opposite ends said casing also having supply nozzles 35 and 36 in pairs with their inner openings on the inner face of the casing, a primary valve in said casing, said valve having a bore 41 in communication at its end with the inlet port 32 of the casing, the primary valve having a passage 40 in open communication at one end with bore 41 and with its other end spaced from said first end and opening through the inner wall of said primary valve, said primary valve also having a passage 42 extending from the inside wall of the valve to the outside wall of the valve in a plane with the nozzles 35, the primary valve having a passage 43 extending from the inside wall of the valve to the outside wall of the valve in the plane of the nozzles 36, the primary valve having a port 44 extending from the inner wall of the valve to a point on the inside wall to communicate with port 33, a secondary valve within the primary valve and having passages 38 and 39, each having its ends at right angles to each other and in the plane of the passages 42, 43 and 44, whereby the secondary valve can be turned to control the amount of flow and the direction of flow through the passages in the primary valve.

JAMES E. WILLIAMSON.